United States Patent
Pan et al.

(10) Patent No.: US 9,693,161 B2
(45) Date of Patent: Jun. 27, 2017

(54) CLOSE-TYPE SPEAKER LEAK TEST SYSTEM AND METHOD

(71) Applicant: Primax Electronics Ltd., Neihu, Taipei (TW)

(72) Inventors: Yung-Tai Pan, Taipei (TW); Jung-Lang Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 246 days.

(21) Appl. No.: 14/482,505

(22) Filed: Sep. 10, 2014

(65) Prior Publication Data

US 2015/0369692 A1    Dec. 24, 2015

(30) Foreign Application Priority Data

Jun. 20, 2014    (TW) .............................. 103121410 A

(51) Int. Cl.
- G01M 3/32 (2006.01)
- H04R 29/00 (2006.01)
- H04R 1/02 (2006.01)

(52) U.S. Cl.
CPC .......... *H04R 29/001* (2013.01); *G01M 3/329* (2013.01); *H04R 1/02* (2013.01)

(58) Field of Classification Search
CPC ...... G01M 3/329; G01M 3/3263; H04R 1/02; H04R 29/001
See application file for complete search history.

(56) References Cited

U.S. PATENT DOCUMENTS

| | | | | |
|---|---|---|---|---|
| 3,192,325 A | * | 6/1965 | Smith, Jr. ............... | H04R 29/00 381/59 |
| 3,504,528 A | * | 4/1970 | Trier ................... | G01M 3/3263 73/49.3 |
| 3,650,145 A | * | 3/1972 | Nelson .................... | G01M 3/02 73/37 |
| 3,738,158 A | * | 6/1973 | Farrell .................. | G01M 3/329 73/40.7 |
| 3,791,197 A | * | 2/1974 | Eukuda .................. | G04D 7/007 73/49.3 |
| 3,792,607 A | * | 2/1974 | Fukuda .................. | G04D 7/007 73/49.3 |
| 3,793,877 A | * | 2/1974 | Fukuda .................. | G04D 7/007 73/49.3 |

(Continued)

*Primary Examiner* — David Bolduc
(74) *Attorney, Agent, or Firm* — Kirton McConkie; Evan R. Witt

(57) ABSTRACT

A close-type speaker leak test system includes a first chamber, a second chamber, a third chamber, a fourth chamber, a vacuum generator, and a differential pressure gauge. Firstly, a negative pressure value of the first chamber and the second chamber is generated by the vacuum generator. A standard close-type speaker is placed within the third chamber, and the first chamber and the third chamber are in communication with each other. An under-test close-type speaker is placed within a fourth chamber, and the second chamber and the fourth chamber are in communication with each other. A pressure difference value between the third chamber and the fourth chamber is measured by the differential pressure gauge. If the pressure difference value is larger than a predetermined value, the under-test close-type speaker has the leak. Consequently, the misjudgment is reduced, and the testing efficiency is enhanced.

1 Claim, 4 Drawing Sheets

(56) References Cited

U.S. PATENT DOCUMENTS

| | | | | |
|---|---|---|---|---|
| 3,837,215 | A * | 9/1974 | Massage | G01M 3/363 73/45.4 |
| 3,839,900 | A * | 10/1974 | Fukuda | G04D 7/007 73/49.3 |
| 4,130,023 | A * | 12/1978 | Henricksen | H04R 29/001 73/647 |
| 4,670,847 | A * | 6/1987 | Furuse | G01M 3/3263 702/51 |
| 4,675,834 | A * | 6/1987 | Furuse | G01M 3/3263 374/4 |
| 4,686,638 | A * | 8/1987 | Furuse | G01M 3/3263 702/51 |
| 4,773,502 | A * | 9/1988 | Adair | H04R 1/02 181/144 |
| 4,811,252 | A * | 3/1989 | Furuse | G01M 3/3263 702/51 |
| 4,858,463 | A * | 8/1989 | Rosse | G01M 3/329 73/49.3 |
| 4,993,256 | A * | 2/1991 | Fukuda | G01M 3/3236 340/605 |
| 5,029,464 | A * | 7/1991 | Lehmann | B07C 5/3408 73/49.3 |
| 5,150,605 | A * | 9/1992 | Simpson | G01M 3/329 73/49.3 |
| 5,365,774 | A * | 11/1994 | Horlacher | G01M 3/363 73/45.4 |
| 5,546,789 | A * | 8/1996 | Balke | G01M 3/3281 73/40 |
| 5,600,996 | A * | 2/1997 | Witschi | G01M 3/3263 73/40 |
| 5,625,141 | A * | 4/1997 | Mahoney | G01M 3/202 73/40.7 |
| 6,308,556 | B1 * | 10/2001 | Sagi | G01M 3/3254 73/40 |
| 6,854,318 | B2 * | 2/2005 | Sagi | G01M 3/04 73/40 |
| 2005/0238178 | A1 * | 10/2005 | Garcia | H04R 29/001 381/59 |
| 2006/0118049 | A1 * | 6/2006 | Song | C23C 16/4412 118/733 |
| 2007/0266773 | A1 * | 11/2007 | Mayer | G01M 3/3272 73/49.3 |
| 2013/0291624 | A1 * | 11/2013 | Yaberg | G01M 3/34 73/40 |
| 2015/0373469 | A1 * | 12/2015 | Pan | H04R 29/001 381/59 |

\* cited by examiner

CLOSE-TYPE SPEAKER LEAK TEST SYSTEM AND METHOD

FIELD OF THE INVENTION

The present invention relates to a speaker leak test system and a speaker leak test method, and more particularly to a close-type speaker leak test system and a close-type speaker leak test method.

BACKGROUND OF THE INVENTION

With the prevalence of various types of audio and video entertainments, it is important to play audio files of electronic devices (e.g. stereo devices, computers, television or mobile phones). Since speakers are able to convert electronic signals into sound waves, speakers become important peripheral electronic devices in modern lives. According to the structures of the sound boxes (also referred as enclosures), speakers are usually classified into close-type speakers and open-type speakers. In the close-type speaker, a speaker unit is placed within an enclosure having no opening, and the space within the enclosure is a sealed space.

In case that the enclosure of the close-type speaker has a leak, the sound wave may irregularly leak out through the leak. Under this circumstance, the sound quality of the close-type speaker is deteriorated. For maintaining the quality of the close-type speaker, it is necessary to test the close-type speaker before the close-type speaker leaves the factory.

Conventionally, some methods for testing whether the close-type speaker has a leak were disclosed. For example, in a conventional testing method, a close-type speaker generates a low-pitched sound so as to produce an air pressure, and an inspector listens to the surface of the close-type speaker through a stethoscope. By detecting whether there in an airflow sound of the leak air, the inspector may judge whether the close-type speaker has a leak. However, the method of judging whether the close-type speaker has a leak according to the airflow sound takes a long testing time period. Moreover, since the judgment of the airflow sound is readily affected by human factors, the possibility of causing misjudgment is increased.

For increasing the testing efficiency and accuracy of testing close-type speakers, there is a need of providing a close-type speaker leak test system and a close-type speaker leak test method in order to solve the above drawbacks.

SUMMARY OF THE INVENTION

An object of the present invention provides a close-type speaker leak test system and a close-type speaker leak test method for testing a close-type speaker more efficiently and accurately.

In accordance with an aspect of the present invention, there is provided a close-type speaker leak test system for testing whether an under-test close-type speaker has a leak. The close-type speaker leak test system includes a vacuum generator, a first chamber, a second chamber, a third chamber, a fourth chamber, and a differential pressure gauge. The first chamber and the second chamber are in communication with the vacuum generator. A default negative pressure value of the first chamber and the second chamber is generated by the vacuum generator. The third chamber contains a standard close-type speaker. When the third chamber is in communication with the first chamber, the third chamber and the first chamber have a first negative pressure value. The fourth chamber contains the under-test close-type speaker. When the fourth chamber is in communication with the second chamber, the fourth chamber and the second chamber have a second negative pressure value. The differential pressure gauge is connected with the third chamber and the fourth chamber, and measures a pressure difference value between the first negative pressure value and the second negative pressure value. The close-type speaker leak test system judges whether a leak value of the under-test close-type speaker is equal to a leak value of the standard close-type speaker according to the pressure difference value, thereby recognizing whether the under-test close-type speaker has the leak.

In accordance with another aspect of the present invention, there is provided a close-type speaker leak test method for testing whether an under-test close-type speaker has a leak. The close-type speaker leak test method includes the following steps. Firstly, a first chamber and a second chamber have a default negative pressure value. The first chamber and a third chamber are in communication with each other, wherein a standard close-type speaker is disposed within the third chamber. The second chamber and a fourth chamber are in communication with each other, wherein the under-test close-type speaker is disposed within the fourth chamber. A pressure difference value between the third chamber and the fourth chamber is measured and compared. If the pressure difference value is larger than a predetermined value, it is judged that the under-test close-type speaker has the leak.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
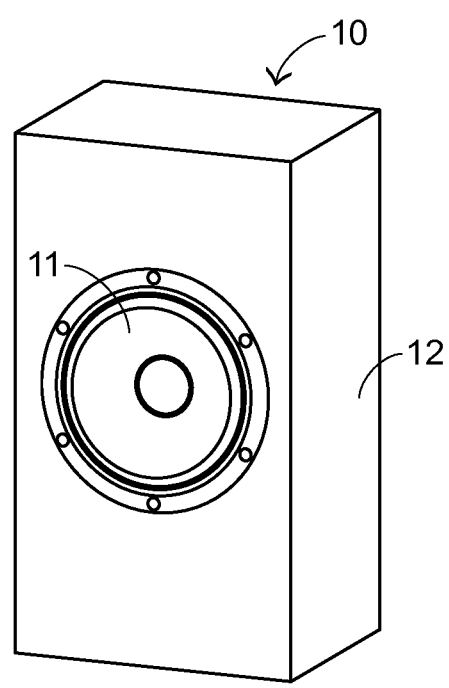
FIG. 1 is a schematic perspective view illustrating a close-type speaker according to a first embodiment of the present invention.

FIG. 1 is a schematic perspective view illustrating a close-type speaker according to a first embodiment of the present invention. As shown in FIG. 1, the close-type speaker 10 comprises a speaker unit 11 and an enclosure 12. The speaker unit 11 is embedded in the enclosure 12. Moreover, the enclosure 12 is a sealed enclosure. In other words, the air within the enclosure 12 and the air outside the enclosure 12 are not in communication with each other. The structure and the operating principle of the close-type speaker 10 are similar to those of the general close-type speaker with the sealed enclosure, and are not redundantly described herein.

Figure 2:
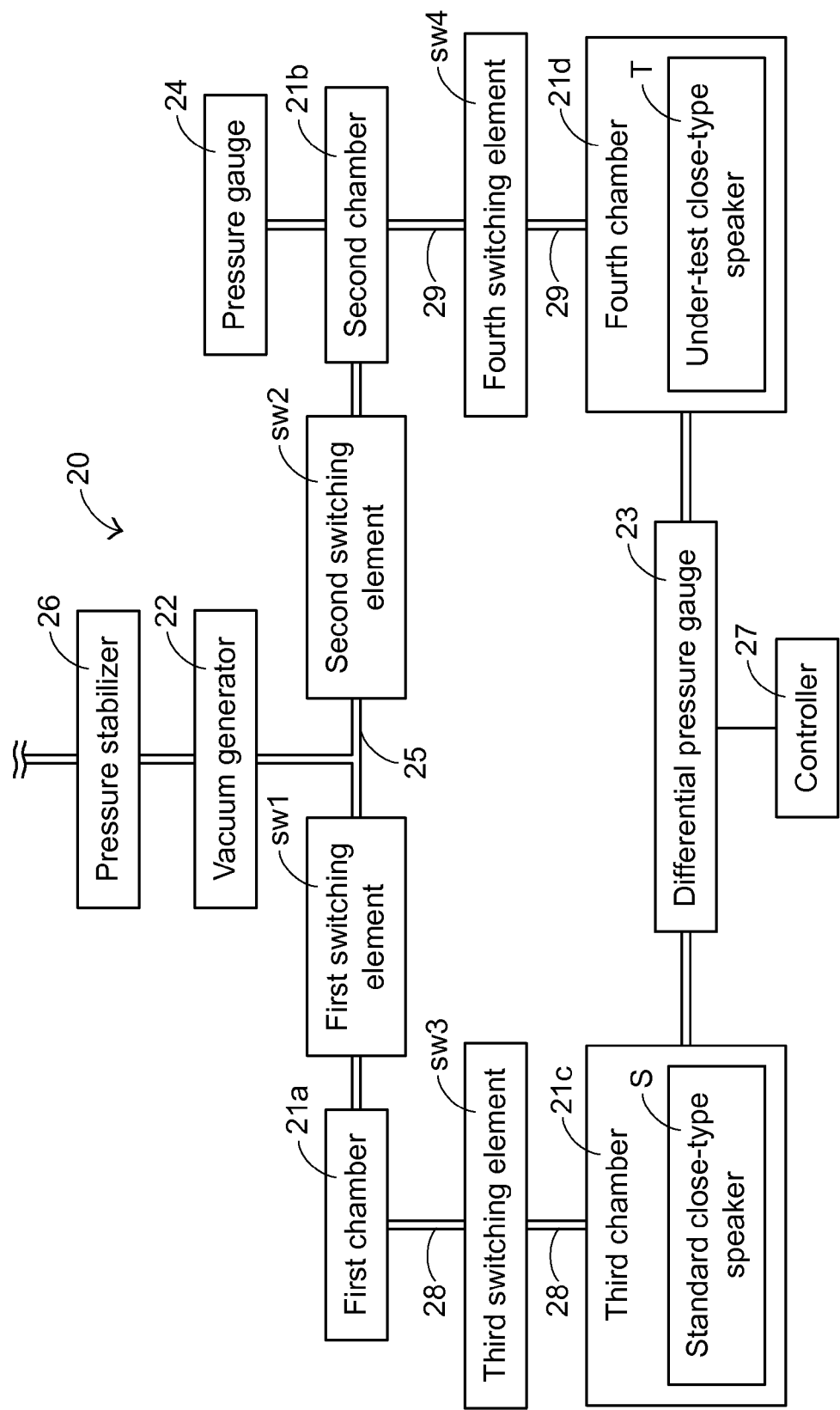
FIG. 2 schematically illustrates the architecture of a close-type speaker leak test system according to a first embodiment of the present invention.

FIG. 2 schematically illustrates the architecture of a close-type speaker leak test system according to a first embodiment of the present invention. As shown in FIG. 2, the close-type speaker leak test system 20 comprises a first chamber 21a, a second chamber 21b, a third chamber 21c, a fourth chamber 21d, a vacuum generator 22, a differential pressure gauge 23, a pressure gauge 24, a communication tube 25, a pressure stabilizer 26, a controller 27, a first switching element sw1, a second switching element sw2, a third switching element sw3, and a fourth switching element sw4. The first chamber 21a, the second chamber 21b, the third chamber 21c and the fourth chamber 21d have sealable hollow chamber bodies. Moreover, the first chamber 21a and the second chamber 21b are in communication with each other through the communication tube 25. The volume of the hollow chamber body of the first chamber 21a is substantially equal to the volume of the hollow chamber body of the second chamber 21b. The volume of the hollow chamber body of the third chamber 21c is substantially equal to the volume of the hollow chamber body of the fourth chamber 21d.

The communication tube 25 is in communication with the first chamber 21a and the second chamber 21b. Consequently, through the communication tube 25, the first chamber 21a is in communication with the vacuum generator 22, and the second chamber 21b is in communication with the vacuum generator 22. The first switching element sw1 and the second switching element sw2 are installed on the communication tube 25. The first switching element sw1 is used for controlling whether the air flows in the region between the first chamber 21a and the vacuum generator 22. The second switching element sw2 is used for controlling whether the air flows in the region between the second chamber 21b and the vacuum generator 22.

By using the flow of the compressed air, the vacuum generator 22 creates a vacuum. Since the air in the first chamber 21a and the second chamber 21b is extracted out by the vacuum generator 22, a default negative pressure value of the first chamber 21a and the second chamber 21b is generated by the vacuum generator 22. When the first switching element sw1 and the second switching element sw2 are turned on but the third switching element sw3 and the fourth switching element sw4 are turned off, the first chamber 21a, the second chamber 21b and the vacuum generator 22 are in communication with each other. Consequently, after the vacuum generator 22 continuously extracts the air of the first chamber 21a and the second chamber 21b for a predetermined time period, the default negative pressure value of the first chamber 21a and the second chamber 21b is generated. Then, the first switching element sw1 and the second switching element sw2 are turned off. Meanwhile, the first chamber 21a and the second chamber 21b are no longer in communication with each other, and the default negative pressure value of the first chamber 21a and the default negative pressure value of the second chamber 21b are stable and identical. In an embodiment, the first switching element sw1 and the second switching element sw2 are solenoid valves, but are not limited thereto. It is noted that the close-type speaker leak test system is not restricted to generate the negative pressure. Alternatively, in another embodiment of the close-type speaker leak test system, a positive pressure generation device may be used to generate a positive pressure in the first chamber 21a and the second chamber 21b.

The pressure gauge 24 is used for measuring the negative pressure value of the first chamber 21a or the second chamber 21b in order to confirm whether the negative pressure value of the first chamber 21a or the second chamber 21b reaches the default negative pressure value. The pressure gage 24 may be installed on the communication tube 25, connected with the first chamber 21a or connected with the second chamber 21b. Alternatively, in another embodiment, the close-type speaker leak test system comprises two pressure gauges 24, and the two pressure gauges 24 are respectively connected with the first chamber 21a and the second chamber 21b in order to assure that the measured negative pressure values of the first chamber 21a and the second chamber 21b are identical. Hereinafter, the pressure gauge 24 connected with the second chamber 21b will be described as an example. That is, the pressure gauge 24 is used to measure the negative pressure value of the second chamber 21b. Since the first chamber 21a and the second chamber 21b are in communication with each other through the communication tube 25, when the first switching element sw1 and the second switching element sw2 are turned on, the negative pressure values of the first chamber 21a and the negative pressure value of the second chamber 21b are substantially identical.

The third chamber 21c is in communication with the first chamber 21a through another communication tube 28. Moreover, the third switching element sw3 is installed on the communication tube 28 for controlling whether the air flows in the region between the first chamber 21a and the third chamber 21c. A standard close-type speaker S is disposed within the third chamber 21c. The standard close-type speaker S is a standard sample of a close-type speaker with no leak or with an acceptable leak condition. When the first switching element sw1 and the third switching element sw3 are turned on, the movement of the air between the first chamber 21a and the third chamber 21c results in a pressure difference between the first chamber 21a and the third chamber 21c. Due to the pressure difference, a convection phenomenon occurs, and a first negative pressure value is obtained. An example of the third switching element sw3 includes but is not limited to a solenoid valve.

The fourth chamber 21d is in communication with the second chamber 21b through another communication tube 29. Moreover, the fourth switching element sw4 is installed on the communication tube 29 for controlling whether the air flows in the region between the second chamber 21b and the fourth chamber 21d. An under-test close-type speaker T is disposed within the fourth chamber 21d. When the second switching element sw2 and the fourth switching element sw4 are turned on, the movement of the air between the second chamber 21b and the fourth chamber 21d results in a pressure difference between the second chamber 21b and the fourth chamber 21d. Due to the pressure difference, a convection phenomenon occurs, and a second negative pressure value is obtained. An example of the fourth switching element sw4 includes but is not limited to a solenoid valve.

The differential pressure gauge 23 is connected with the third chamber 21c and the fourth chamber 21d for measuring a pressure difference value between the first negative pressure value of the third chamber 21c and the second negative pressure value of the fourth chamber 21d. If the pressure difference value is larger than a predetermined value, it means that the effective volume of the third chamber 21c for reaching the pressure equilibrium state and the effective volume of the fourth chamber 21d for reaching the pressure equilibrium state are not equal. In other words, since the under-test close-type speaker T within the fourth chamber 21d has a leak, the inner space of the under-test close-type speaker T becomes the effective volume of the fourth chamber 21d. Under this circumstance, the pressure difference value between the first negative pressure value and the second negative pressure value is too large.

The controller 27 is electrically connected with the differential pressure gauge 23. The pressure difference value measured by the differential pressure gauge 23 is transmitted to the controller 27. If the pressure difference value is larger than the predetermined value, the controller 27 judges that the under-test close-type speaker T is not comparable to the standard close-type speaker S. Consequently, the controller 27 can recognize that the under-test close-type speaker T has a leak or exceeds the acceptable leak condition.

Moreover, the close-type speaker leak test system 20 is further equipped with the pressure stabilizer 26. During the process of testing the close-type speaker, the pressure stabilizer 26 can control whether the air flows in the communication tube 25 and control the airflow amount in the communication tube 25 in order to stabilize the air pressure of the communication tube 25. The pressure stabilizer 26 is located at an end of the vacuum generator 22, but is not limited thereto.

From the above descriptions, the vacuum generator 22 is not directly connected with the third chamber 21c and the fourth chamber 21d. On the other hand, the vacuum generator 22 is firstly in communication with the first chamber 21a and the second chamber 21b to generate the default negative pressure value of the first chamber 21a and the second chamber 21b. Then, the first chamber 21a is in communication with the third chamber 21c to provide stabilized air pressure to the third chamber 21c, and the second chamber 21b is in communication with the fourth chamber 21d to provide the stabilized air pressure to the fourth chamber 21d. When the air pressure in the first chamber 21a and the third chamber 21c reaches the equilibrium state and the air pressure in the second chamber 21b and the fourth chamber 21d reaches the equilibrium state, the small pressure difference value between the third chamber 21c and the fourth chamber 21d is measured. Consequently, the negative pressure value provided from the first chamber 21a to the third chamber 21c and the negative pressure value provided from the second chamber 21b to the fourth chamber 21d are stable and identical. Since the fluctuation of the air pressure caused by the vacuum generator 22 has less influence on the differential pressure gauge 23, the pressure difference value measured by the differential pressure gauge 23 is more accurate. In other words, the possibility of misjudging the under-test close-type speaker T as the unqualified product is reduced.

Figure 3:
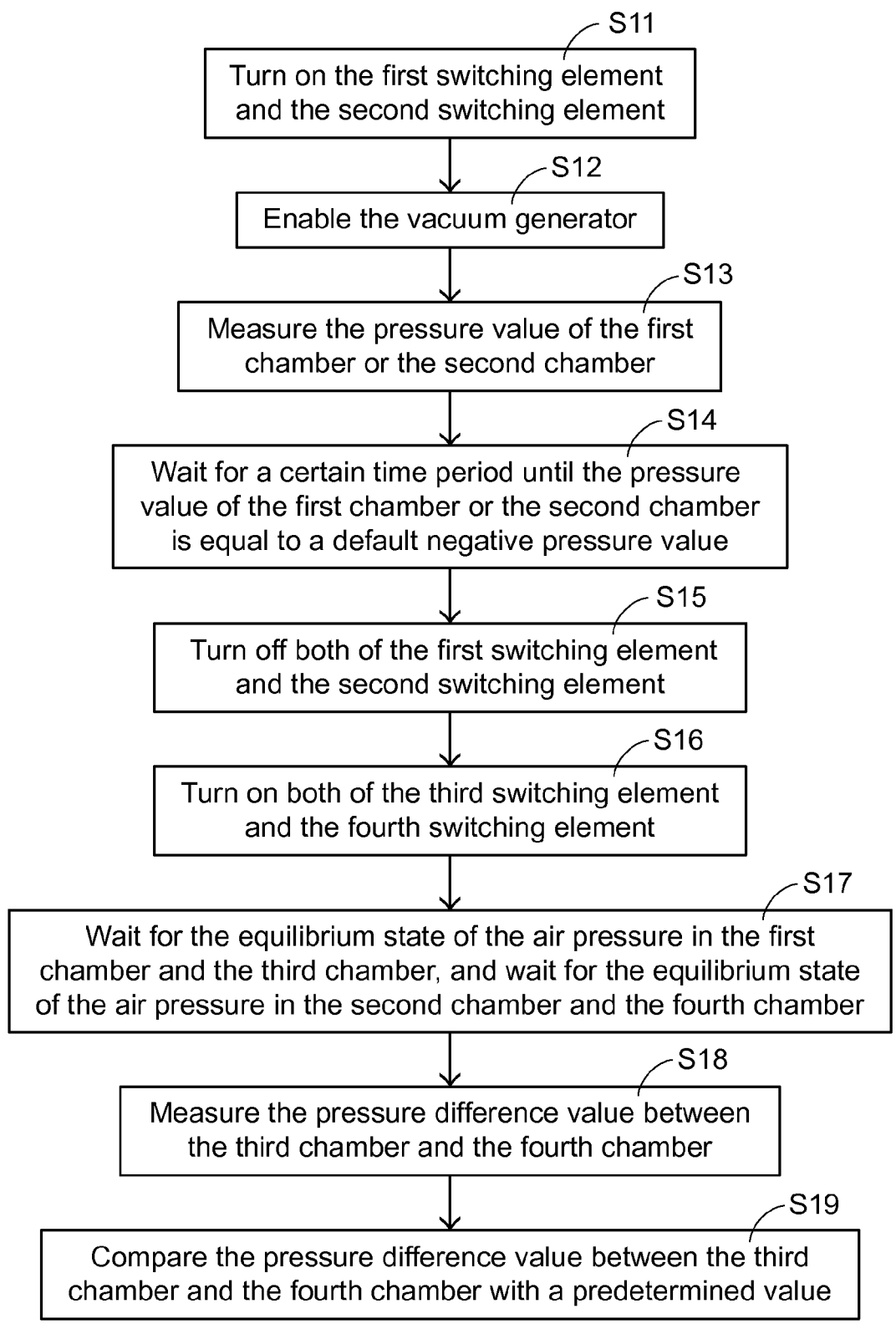
FIG. 3 schematically illustrates the flowchart of a close-type speaker leak test method according to an embodiment of the present invention.

Hereinafter, a close-type speaker leak test method according to an embodiment of the present invention will be illustrated with reference to FIG. 3. FIG. 3 schematically illustrates the flowchart of a close-type speaker leak test method according to an embodiment of the present invention. As shown in FIG. 3, the close-type speaker leak test method comprises the steps S11~S19.

Firstly, in the step S11, the first switching element sw1 and the second switching element sw2 are turned on. Consequently, the first chamber 21a and the second chamber 21b are in communication with each other.

Then, in the step S12, the vacuum generator 22 is enabled. Consequently, a negative pressure value of the first chamber 21a and the second chamber 21b is generated by the vacuum generator 22.

Then, in the step S13, the pressure value of the first chamber 21a or the second chamber 21b is measured by the pressure gauge 24.

Then, the step S14 is performed to wait for a time period until the pressure value of the first chamber 21a or the second chamber 21b is equal to a default negative pressure value.

Then, in the step S15, the first switching element sw1 and the second switching element sw2 are both turned off. Consequently, the first chamber 21a and the second chamber 21b are not in communication with each other.

Then, in the step S16, both of the third switching element sw3 and the fourth switching element sw4 are turned on.

Then, in the step S17, a first negative pressure value of the third chamber 21c is generated after the first chamber 21a and the third chamber 21c have been in communication with each other for a predetermined time period, and a second negative pressure value of the fourth chamber 21d is generated after the second chamber 21b and the fourth chamber 21d have been in communication with each other for the same predetermined time period. An example of the predetermined time period includes but is not limited to 5 seconds. In some other embodiments, the predetermined time period is the time period for allowing the air pressure in the first chamber 21a and the third chamber 21c to reach the equilibrium state and allowing the air pressure in the second chamber 21b and the fourth chamber 21d to reach the equilibrium state.

In the step S18, a pressure difference value between the first negative pressure value of the third chamber 21c and the second negative pressure value of the fourth chamber 21d is measured.

In the step S19, the pressure difference value between the third chamber 21c and the fourth chamber 21d is compared with a predetermined value. An example of the predetermined value includes but is not limited to 140 Pa.

If the pressure difference value is larger than the predetermined value (e.g. 140 Pa), it means that the effective volume of the third chamber 21c for reaching the pressure equilibrium state and the effective volume of the fourth chamber 21d for reaching the pressure equilibrium state are not equal. In other words, since the under-test close-type speaker T within the fourth chamber 21d has a leak, the inner space of the under-test close-type speaker T becomes the effective volume of the fourth chamber 21d. Under this circumstance, the pressure difference value between the first negative pressure value and the second negative pressure value is too large. Since a leak value of the under-test close-type speaker T is not equal to a leak value of the standard close-type speaker S, the controller 27 judges that the under-test close-type speaker T is an unqualified product.

In this embodiment, the step of comparing the pressure difference value with the predetermined value is performed by the controller 27, which is electrically connected with the differential pressure gauge 23. It is noted that the step of comparing the pressure difference value with the predetermined value is not restricted to be performed by the controller. For example, in some other embodiments, the step of comparing the pressure difference value with the predetermined value may be performed by an inspector.

Figure 4:
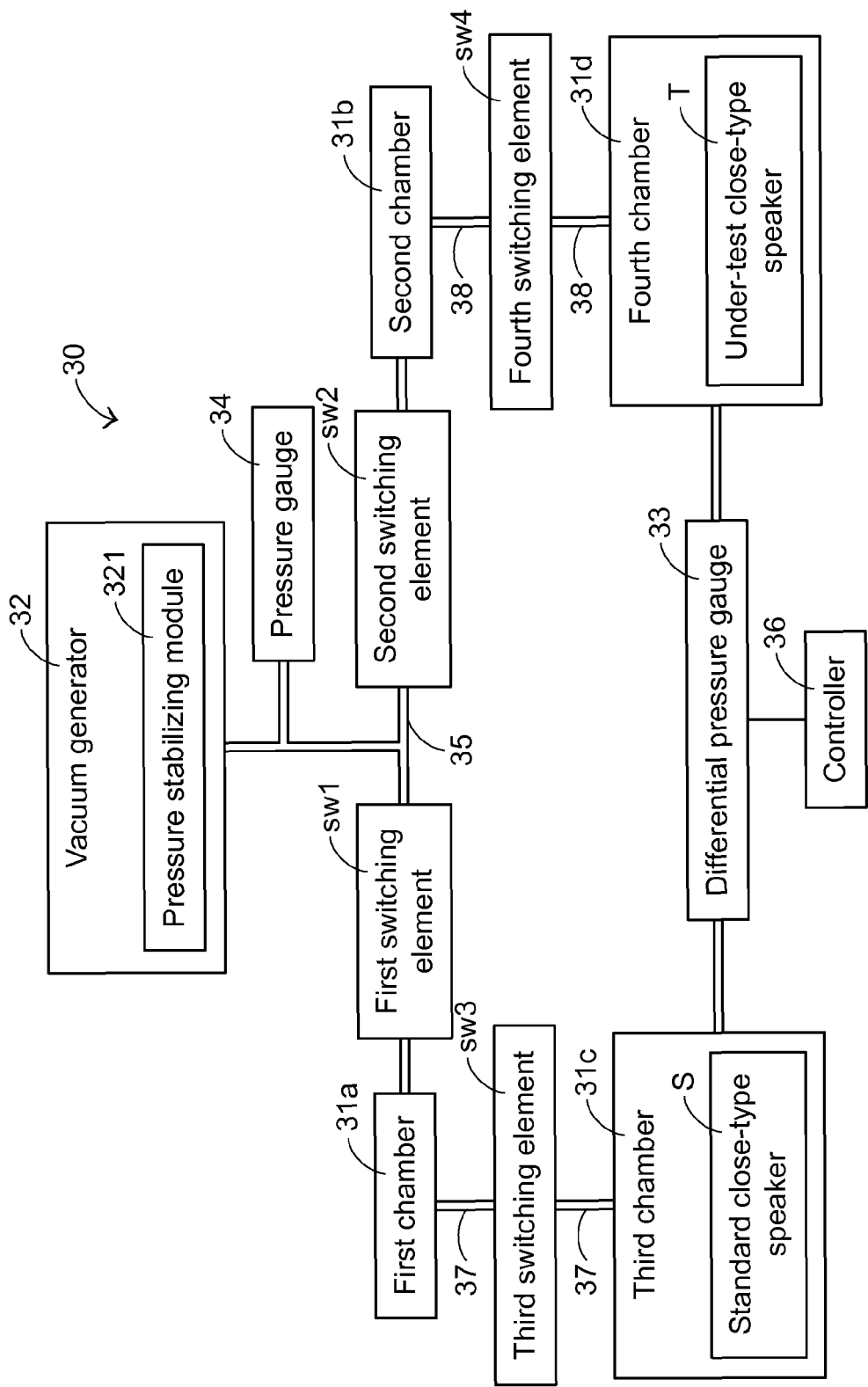
FIG. 4 schematically illustrates the architecture of a close-type speaker leak test system according to a second embodiment of the present invention.

Hereinafter, a close-type speaker leak test system according to a second embodiment of the present invention will be illustrated with reference to FIG. 4. FIG. 4 schematically illustrates the architecture of a close-type speaker leak test system according to a second embodiment of the present invention. The close-type speaker leak test system 30 of FIG. 4 is used to test a close-type speaker T.

As shown in FIG. 4, the close-type speaker leak test system 30 comprises a first chamber 31a, a second chamber 31b, a third chamber 31c, a fourth chamber 31d, a vacuum generator 32, a differential pressure gauge 33, a pressure gauge 34, three communication tubes 35, 37, 38, a controller 36, a first switching element sw1, a second switching element sw2, a third switching element sw3, and a fourth switching element sw4. A standard close-type speaker S is disposed within the third chamber 31c. The close-type speaker T is disposed within the fourth chamber 31d.

In comparison with the close-type speaker leak test system 20 of FIG. 2, the vacuum generator 32 comprises a pressure stabilizing module 321. The pressure stabilizing module 321 of the vacuum generator 32 is used for replacing the pressure stabilizer 26 of the close-type speaker leak test system 20 of FIG. 3. The other components of the close-type speaker leak test system 30 of FIG. 4 are similar to those of the close-type speaker leak test system 20 of FIG. 2, and are not redundantly described herein.

The air pressure of the communication tube 35 is stabilized by the pressure stabilizing module 321. Moreover, in this embodiment, the pressure gauge 34 is in communication with the communication tube 35. The pressure gauge 34 is used for measuring the negative pressure value of the communication tube 35. Since the communication tube 35 is in communication with the first chamber 31a and the second chamber 31b, the negative pressure value of the communication tube 35 is equal to the negative pressure value of the first chamber 31a and the negative pressure value of the second chamber 31b. The operations of the close-type speaker leak test system 30 are similar to those of the close-type speaker leak test system 20 of FIG. 2, and are not redundantly described herein.

From the above descriptions, the present invention provides the close-type speaker leak test system and the close-type speaker leak test method. Firstly, a negative pressure value of the first chamber and the second chamber is generated by the vacuum generator. Then, the air pressure in the first chamber and the third chamber reaches the equilibrium state, and the air pressure in the second chamber and the fourth chamber reaches the equilibrium state. Then, by measuring and comparing the pressure difference value between the third chamber containing the standard close-type speaker and the fourth chamber containing the under-test close-type speaker, the close-type speaker leak test system judges whether the leak value of the under-test close-type speaker is identical to the leak value of the standard close-type speaker in order to recognize whether the under-test close-type speaker has a leak.

After the chambers and the differential pressure gauge are assembled as the close-type speaker leak test system, the close-type speaker leak test method of the present invention may be implemented. In comparison with the conventional leak test method using the stethoscope, the close-type speaker leak test method of the present invention can reduce the possibility of causing human misjudgment and increase the efficiency of testing the leak of the close-type speaker.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A close-type speaker leak test method for testing whether an under-test close-type speaker has a leak, the close-type speaker leak test method comprising steps of:

communicating a first chamber and a second chamber, and generating a negative pressure value in the first chamber and the second chamber;

cutting off the communication between the first chamber and the second chamber when the negative pressure values of the first chamber and the second chamber are both equal to a default negative pressure value;

allowing the first chamber and a third chamber to be in communication with each other for a predetermined time so that a first negative pressure value is generated in the third chamber, wherein a standard close-type speaker is disposed within the third chamber;

allowing the second chamber and fourth chamber to be in communication with each other for the predetermined time so that a second negative pressure value is generated in the fourth chamber, wherein the under-test close-type speaker is disposed within the fourth chamber; and measuring and comparing a pressure difference value between the first negative pressure value of the third chamber and the second negative pressure value of the fourth chamber, wherein if the pressure difference value is larger than a predetermined value, judging that the under-test close-type speaker has the leak.

* * * * *